US012100925B2

(12) United States Patent
Van Swearingen

(10) Patent No.: US 12,100,925 B2
(45) Date of Patent: *Sep. 24, 2024

(54) ULTRASONIC WELD INTERCONNECTION COAXIAL CONNECTOR AND INTERCONNECTION WITH COAXIAL CABLE

(71) Applicant: Outdoor Wireless Networks LLC, Claremont, NC (US)

(72) Inventor: Kendrick Van Swearingen, Woodridge, IL (US)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,423

(22) Filed: Sep. 11, 2023

(65) Prior Publication Data

US 2024/0145951 A1    May 2, 2024

Related U.S. Application Data

(63) Continuation of application No. 17/935,380, filed on Sep. 26, 2022, now Pat. No. 11,757,212, which is a
(Continued)

(51) Int. Cl.
*H01R 9/05*  (2006.01)
*B23K 20/10*  (2006.01)
(Continued)

(52) U.S. Cl.
CPC .......... *H01R 9/0503* (2013.01); *B23K 20/10* (2013.01); *H01R 4/029* (2013.01); *H01R 24/40* (2013.01);
(Continued)

(58) Field of Classification Search
CPC ...... H01R 9/0503; H01R 4/029; H01R 24/40; H01R 43/0207; H01R 9/0524; H01R 13/5845; Y10T 29/49174; Y10T 29/49179
See application file for complete search history.

(56) References Cited

U.S. PATENT DOCUMENTS 3,089,105 A    5/1963  Alford
3,142,716 A    7/1964  Gardener
(Continued)

FOREIGN PATENT DOCUMENTS

CN    1606200 A    4/2005
CN    1623254 A    6/2005
(Continued)

OTHER PUBLICATIONS

"Chinese Office Action and Search Report Corresponding to Chinese Application No. 201380057933.8; Date of Issuance: Jun. 30, 2016; Foreign Text 8 Pages, English Translation Thereof, 9 Pages".
(Continued)

*Primary Examiner* — Briggitte R. Hammond
(74) *Attorney, Agent, or Firm* — Myers Bigel, P.A.

(57) ABSTRACT

A coaxial connector for interconnection with a coaxial cable with a solid outer conductor by ultrasonic welding is provided with a monolithic connector body with a bore. An annular flare seat is angled radially outward from the bore toward a connector end of the connector, the annular flare seat open to the connector end of the connector. An inner conductor cap is provided for interconnection with an inner conductor of the coaxial cable by ultrasonic welding. The ultrasonic welding of each of the inner and outer conductor interconnections may be performed via inner conductor and outer conductor sonotrodes which are coaxial with one another, without requiring the cable and or connector to be removed from their fixture.

15 Claims, 8 Drawing Sheets

Related U.S. Application Data continuation of application No. 17/079,047, filed on Oct. 23, 2020, now Pat. No. 11,462,843, which is a continuation of application No. 16/879,926, filed on May 21, 2020, now Pat. No. 10,819,046, which is a continuation of application No. 15/693,974, filed on Sep. 1, 2017, now Pat. No. 10,665,967, which is a continuation of application No. 13/712,289, filed on Dec. 12, 2012, now Pat. No. 9,755,328, which is a continuation-in-part of application No. 13/161,326, filed on Jun. 15, 2011, now Pat. No. 8,365,404, which is a continuation-in-part of application No. 12/980,013, filed on Dec. 28, 2010, now Pat. No. 8,453,320, and a continuation-in-part of application No. 12/974,765, filed on Dec. 21, 2010, now Pat. No. 8,563,861, which is a continuation-in-part of application No. 12/951,558, filed on Nov. 22, 2010, now Pat. No. 8,826,525, said application No. 12/980,013 is a continuation-in-part of application No. 12/951,558, filed on Nov. 22, 2010, now Pat. No. 8,826,525.

(51) Int. Cl.
| | |
|---|---|
| *B29C 65/56* | (2006.01) |
| *B29L 31/34* | (2006.01) |
| *H01R 4/02* | (2006.01) |
| *H01R 13/58* | (2006.01) |
| *H01R 24/40* | (2011.01) |
| *H01R 43/02* | (2006.01) |
| *H01R 43/20* | (2006.01) |
| *B23K 101/38* | (2006.01) |
| *B29C 65/00* | (2006.01) |
| *B29C 65/06* | (2006.01) |

(52) U.S. Cl.
CPC ...... *H01R 43/0207* (2013.01); *B23K 2101/38* (2018.08); *B29C 65/06* (2013.01); *B29C 65/565* (2013.01); *B29C 66/30223* (2013.01); *B29C 66/526* (2013.01); *B29C 66/5344* (2013.01); *B29L 2031/3462* (2013.01); *H01R 9/05* (2013.01); *H01R 9/0524* (2013.01); *H01R 13/5845* (2013.01); *H01R 43/20* (2013.01); *Y10T 29/49123* (2015.01); *Y10T 29/49174* (2015.01); *Y10T 29/49179* (2015.01); *Y10T 29/49185* (2015.01)

(56) References Cited

U.S. PATENT DOCUMENTS

| | | |
|---|---|---|
| 3,219,557 A | 11/1965 | Quintana |
| 3,245,027 A | 4/1966 | Ziegler, Jr. |
| 3,264,602 A | 8/1966 | Oscar |
| 3,281,756 A | 10/1966 | Francis et al. |
| 3,295,095 A | 12/1966 | Karl |
| 3,384,703 A | 5/1968 | Forney, Jr. et al. |
| 3,453,376 A | 7/1969 | Ziegler, Jr. et al. |
| 3,497,866 A | 2/1970 | Patton |
| 3,601,776 A | 8/1971 | Curl |
| 3,644,878 A | 2/1972 | Toedtman |
| 3,656,092 A | 4/1972 | Swengel, Sr. et al. |
| 3,665,367 A | 5/1972 | Keller et al. |
| 3,690,088 A | 9/1972 | Anderson et al. |
| 3,693,238 A | 9/1972 | Hoch et al. |
| 3,720,805 A | 3/1973 | Fitzgerald |
| 3,728,781 A | 4/1973 | Curtis et al. |
| 3,897,896 A | 8/1975 | Louw et al. |
| 3,897,897 A | 8/1975 | Satzler et al. |
| 3,917,497 A | 11/1975 | Stickler |
| 3,949,466 A | 4/1976 | O'Brien et al. |
| 3,980,976 A | 9/1976 | Tadama et al. |
| 4,039,244 A | 8/1977 | Leachy |
| 4,046,451 A | 9/1977 | Juds et al. |
| 4,090,898 A | 5/1978 | Tuskos |
| 4,176,909 A | 12/1979 | Prunier |
| 4,226,652 A | 10/1980 | Berg |
| 4,235,498 A | 11/1980 | Snyder |
| 4,241,973 A | 12/1980 | Mayer et al. |
| 4,353,761 A | 10/1982 | Woerz et al. |
| 4,397,515 A | 8/1983 | Russell |
| 4,457,795 A | 7/1984 | Mason et al. |
| 4,521,642 A | 6/1985 | Vives |
| 4,534,751 A | 8/1985 | Fortuna et al. |
| 4,584,037 A | 4/1986 | Fortuna et al. |
| 4,715,821 A | 12/1987 | Axell |
| 4,741,788 A | 5/1988 | Clark et al. |
| 4,743,331 A | 5/1988 | Nuttall et al. |
| 4,746,305 A | 5/1988 | Nomura |
| 4,790,375 A | 12/1988 | Bridges et al. |
| 4,790,775 A | 12/1988 | David |
| 4,824,400 A | 4/1989 | Spinner |
| 4,846,714 A | 7/1989 | Welsby et al. |
| 4,867,370 A | 9/1989 | Welter et al. |
| 4,891,015 A | 1/1990 | Oldfield |
| 4,943,245 A | 7/1990 | Lincoln |
| 5,046,952 A | 9/1991 | Cohen et al. |
| 5,064,485 A | 11/1991 | Smith et al. |
| 5,074,809 A | 12/1991 | Rousseau |
| 5,076,657 A | 12/1991 | Toya et al. |
| 5,120,237 A | 6/1992 | Fussell |
| 5,120,268 A | 6/1992 | Gerrans |
| 5,137,470 A | 8/1992 | Doles |
| 5,137,478 A | 8/1992 | Graf et al. |
| 5,142,763 A | 9/1992 | Toya et al. |
| 5,154,636 A | 10/1992 | Vaccaro et al. |
| 5,167,533 A | 12/1992 | Rauwolf |
| 5,186,644 A | 2/1993 | Pawlicki et al. |
| 5,203,079 A | 4/1993 | Brinkman et al. |
| 5,284,449 A | 2/1994 | Vaccaro |
| 5,299,939 A | 4/1994 | Walker et al. |
| 5,354,217 A | 10/1994 | Gabel et al. |
| 5,385,490 A | 1/1995 | Demeter et al. |
| 5,435,745 A | 7/1995 | Booth |
| 5,464,963 A | 11/1995 | Hostler et al. |
| 5,474,470 A | 12/1995 | Hammond, Jr. |
| 5,486,123 A | 1/1996 | Miyazaki |
| 5,542,861 A | 8/1996 | Anhalt et al. |
| 5,545,059 A | 8/1996 | Nelson |
| 5,561,900 A | 10/1996 | Hosler, Sr. |
| 5,595,499 A | 1/1997 | Zander et al. |
| 5,700,989 A | 12/1997 | Dykhno et al. |
| 5,711,686 A | 1/1998 | Osullivan et al. |
| 5,722,856 A | 3/1998 | Fuchs et al. |
| 5,733,145 A | 3/1998 | Wood |
| 5,789,725 A | 8/1998 | McIntire et al. |
| 5,791,919 A | 8/1998 | Brisson et al. |
| 5,796,315 A | 8/1998 | Gordon et al. |
| 5,802,710 A | 9/1998 | Bufanda et al. |
| 5,802,711 A | 9/1998 | Card et al. |
| 5,823,824 A | 10/1998 | Mitamura et al. |
| 5,830,009 A | 11/1998 | Tettinger |
| 5,929,728 A | 7/1999 | Barnett et al. |
| 5,938,474 A | 8/1999 | Nelson |
| 5,994,646 A | 11/1999 | Broeksteeg et al. |
| 6,007,378 A | 12/1999 | Oeth |
| 6,024,609 A | 2/2000 | Kooiman et al. |
| 6,032,835 A | 3/2000 | Burt |
| 6,036,237 A | 3/2000 | Sweeney |
| 6,056,577 A | 5/2000 | Blanchet |
| 6,093,043 A | 7/2000 | Gray et al. |
| 6,105,849 A | 8/2000 | Mochizuki et al. |
| 6,126,487 A | 10/2000 | Rosenberger |
| 6,133,532 A | 10/2000 | Lundbaeck et al. |
| 6,139,354 A | 10/2000 | Broussard |
| 6,148,237 A | 11/2000 | Das |
| 6,155,212 A | 12/2000 | McAlister |
| 6,173,097 B1 | 1/2001 | Throckmorton et al. |
| 6,174,200 B1 | 1/2001 | Bigotto et al. |
| 6,176,716 B1 | 1/2001 | Mercurio et al. |
| 6,210,222 B1 | 4/2001 | Langham et al. |

(56) References Cited

U.S. PATENT DOCUMENTS

| | | |
|---|---|---|
| 6,267,621 B1 | 7/2001 | Pitschi et al. |
| 6,287,301 B1 | 9/2001 | Thompson et al. |
| 6,332,808 B1 | 12/2001 | Kanda et al. |
| 6,361,364 B1 | 3/2002 | Holland et al. |
| 6,362,428 B1 | 3/2002 | Pennington |
| 6,394,187 B1 | 5/2002 | Dickson et al. |
| 6,407,722 B1 | 6/2002 | Bogner et al. |
| 6,439,924 B1 | 8/2002 | Kooiman |
| 6,471,545 B1 | 10/2002 | Hosler, Sr. |
| 6,482,036 B1 | 11/2002 | Broussard |
| 6,538,203 B1 | 3/2003 | Noelle et al. |
| 6,588,646 B2 | 7/2003 | Loprire |
| 6,607,398 B2 | 8/2003 | Henningsen |
| 6,607,399 B2 | 8/2003 | Endo et al. |
| 6,632,118 B2 | 10/2003 | Jacob |
| 6,752,668 B2 | 6/2004 | Koch, Jr. |
| 6,776,620 B2 | 8/2004 | Noda |
| 6,786,767 B1 | 9/2004 | Fuks et al. |
| 6,790,080 B2 | 9/2004 | Cannon |
| 6,793,095 B1 | 9/2004 | Dulisse et al. |
| 6,814,625 B2 | 11/2004 | Richmond et al. |
| 6,824,415 B2 | 11/2004 | Wlos |
| 6,827,608 B2 | 12/2004 | Hall et al. |
| 6,832,785 B1 | 12/2004 | Zitkovic |
| 6,837,751 B2 | 1/2005 | Vanden Wymelenberg et al. |
| 6,908,114 B2 | 6/2005 | Moner |
| 6,932,644 B1 | 8/2005 | Taylor |
| 6,955,562 B1 | 10/2005 | Henningsen |
| 6,974,615 B2 | 12/2005 | Hosaka et al. |
| 7,044,785 B2 | 5/2006 | Harwath et al. |
| 7,061,829 B2 | 6/2006 | Scott |
| 7,077,700 B2 | 7/2006 | Henningsen |
| 7,114,990 B2 | 10/2006 | Bence et al. |
| 7,134,190 B2 | 11/2006 | Bungo et al. |
| 7,144,274 B2 | 12/2006 | Taylor |
| 7,198,208 B2 | 4/2007 | Dye et al. |
| 7,217,154 B2 | 5/2007 | Harwath |
| 7,275,957 B1 | 10/2007 | Wlos et al. |
| 7,294,023 B2 | 11/2007 | Schneider |
| 7,309,247 B1 | 12/2007 | Keating |
| 7,335,059 B2 | 2/2008 | Vaccaro |
| 7,347,727 B2 | 3/2008 | Wlos et al. |
| 7,347,738 B2 | 3/2008 | Hsieh et al. |
| 7,351,101 B1 | 4/2008 | Montena |
| 7,374,466 B2 | 5/2008 | Onuma et al. |
| 7,399,069 B2 | 7/2008 | Therien |
| 7,435,135 B2 | 10/2008 | Wlos |
| 7,448,906 B1 | 11/2008 | Islam |
| 7,476,114 B1 | 1/2009 | Contreras |
| 7,500,873 B1 | 3/2009 | Hart |
| 7,520,779 B2 | 4/2009 | Arnaud et al. |
| 7,588,460 B2 | 9/2009 | Malloy et al. |
| 7,607,942 B1 | 10/2009 | Van Swearingen |
| 7,632,143 B1 | 12/2009 | Islam |
| 7,677,812 B2 | 3/2010 | Castagna et al. |
| 7,705,238 B2 | 4/2010 | Van Swearingen |
| 7,731,529 B1 | 6/2010 | Islam |
| 7,753,727 B1 | 7/2010 | Islam et al. |
| 7,754,038 B2 | 7/2010 | Ripplinger et al. |
| 7,798,847 B2 | 9/2010 | Islam |
| 7,798,848 B2 | 9/2010 | Islam |
| 7,803,018 B1 | 9/2010 | Islam |
| 7,806,444 B2 | 10/2010 | Blivet et al. |
| 7,819,302 B2 | 10/2010 | Bolser et al. |
| 7,819,698 B2 | 10/2010 | Islam |
| 7,823,763 B2 | 11/2010 | Sachdev et al. |
| 8,113,879 B1 | 2/2012 | Zraik |
| 8,174,132 B2 | 5/2012 | Van Swearingen |
| 8,302,296 B2 | 11/2012 | Van Swearingen |
| 8,317,539 B2 | 11/2012 | Stein |
| 8,388,377 B2 | 3/2013 | Zraik |
| 8,453,320 B2 | 6/2013 | Van Swearingen et al. |
| 8,469,739 B2 | 6/2013 | Rodrigues et al. |
| 8,479,383 B2 | 7/2013 | Van Swearingen et al. |
| 8,545,263 B2 | 10/2013 | Islam |
| 8,597,050 B2 | 12/2013 | Flaherty et al. |
| 8,622,762 B2 | 1/2014 | Van Swearingen et al. |
| 8,690,602 B2 | 4/2014 | Flaherty |
| 8,801,460 B2 | 8/2014 | Van Swearingen et al. |
| 8,826,525 B2 | 9/2014 | Vaccaro et al. |
| 8,887,379 B2 | 11/2014 | Van Swearingen et al. |
| 8,887,388 B2 | 11/2014 | Van Swearingen et al. |
| 9,889,586 B2 | 2/2018 | Van Swearingen et al. |
| 11,437,766 B2 | 9/2022 | Van Swearingen et al. |
| 11,437,767 B2 | 9/2022 | Van Swearingen et al. |
| 11,462,843 B2 * | 10/2022 | Van Swearingen .. H01R 9/0503 |
| 11,735,874 B2 | 8/2023 | Van Swearingen et al. |
| 11,757,212 B2 * | 9/2023 | Van Swearingen ......................... H01R 43/0207 29/863 |
| 2003/0137372 A1 | 7/2003 | Fehrenbach et al. |
| 2004/0082212 A1 | 4/2004 | Cannon |
| 2004/0118590 A1 | 6/2004 | Head |
| 2004/0196115 A1 | 10/2004 | Fallon et al. |
| 2005/0118590 A1 | 6/2005 | Piel |
| 2005/0181652 A1 | 8/2005 | Montena et al. |
| 2005/0250371 A1 | 11/2005 | Koga |
| 2005/0285702 A1 | 12/2005 | Graczyk et al. |
| 2006/0137893 A1 | 6/2006 | Sumi et al. |
| 2006/0199432 A1 | 9/2006 | Taylor |
| 2007/0042642 A1 | 2/2007 | Montena et al. |
| 2007/0141911 A1 | 6/2007 | Yoshikawa et al. |
| 2007/0190868 A1 | 8/2007 | De Cloet et al. |
| 2007/0224880 A1 | 9/2007 | Wlos et al. |
| 2007/0259565 A1 | 11/2007 | Holland |
| 2007/0272724 A1 | 11/2007 | Christopherson |
| 2009/0151975 A1 | 6/2009 | Moe et al. |
| 2009/0218027 A1 | 9/2009 | Moe |
| 2009/0232594 A1 | 9/2009 | Ng et al. |
| 2010/0041271 A1 | 2/2010 | Van Swearingen et al. |
| 2010/0124839 A1 | 5/2010 | Montena |
| 2010/0130060 A1 | 5/2010 | Islam |
| 2010/0190377 A1 | 7/2010 | Islam |
| 2010/0190378 A1 | 7/2010 | Islam |
| 2010/0233903 A1 | 9/2010 | Islam |
| 2010/0254663 A1 | 10/2010 | Hopkins et al. |
| 2010/0288819 A1 | 11/2010 | Huenig et al. |
| 2011/0028023 A1 | 2/2011 | Mahoney |
| 2011/0201232 A1 | 8/2011 | Islam |
| 2011/0239451 A1 | 10/2011 | Montena et al. |
| 2012/0124827 A1 | 5/2012 | Baldauf |
| 2012/0129375 A1 | 5/2012 | Van Swearingen |
| 2012/0129383 A1 | 5/2012 | Swearingen |
| 2012/0129384 A1 | 5/2012 | Van Swearingen |
| 2012/0129388 A1 | 5/2012 | Vaccaro et al. |
| 2012/0129389 A1 | 5/2012 | Van Swearingen |
| 2012/0129390 A1 | 5/2012 | Van Swearingen et al. |
| 2012/0129391 A1 | 5/2012 | Van Swearingen et al. |
| 2013/0023973 A1 | 1/2013 | Richard et al. |
| 2013/0025121 A1 | 1/2013 | Van Swearingen et al. |
| 2013/0084738 A1 | 4/2013 | Van Swearingen et al. |
| 2013/0084740 A1 | 4/2013 | Paynter et al. |
| 2013/0095695 A1 | 4/2013 | Van Swearingen |
| 2013/0244487 A1 | 9/2013 | Van Swearingen et al. |
| 2014/0154921 A1 | 6/2014 | Qi et al. |
| 2015/0229070 A1 | 8/2015 | Van Swearingen |
| 2015/0340804 A1 | 11/2015 | Van Swearingen et al. |
| 2017/0133769 A1 | 5/2017 | Harwath et al. |
| 2017/0170612 A1 | 6/2017 | Van Swearingen et al. |
| 2017/0338613 A1 | 11/2017 | Van Swearingen |

FOREIGN PATENT DOCUMENTS

| | | |
|---|---|---|
| CN | 101055948 A | 10/2007 |
| CN | 201084845 Y | 7/2008 |
| CN | 101494326 A | 7/2009 |
| CN | 102610973 A | 7/2012 |
| DE | 4210547.1 C1 | 6/1993 |
| EP | 0555933 A1 | 8/1993 |
| EP | 0779676 A1 | 6/1997 |
| EP | 1001496 A2 | 5/2000 |
| EP | 1947661 A1 | 7/2008 |
| EP | 1956687 A2 | 8/2008 |
| EP | 2144338 A1 | 1/2010 |

(56) References Cited

FOREIGN PATENT DOCUMENTS

| EP | 2214265 A1 | 8/2010 |
|---|---|---|
| EP | 2219267 A1 | 8/2010 |
| FR | 2164172 A5 | 7/1973 |
| GB | 2057781 A | 4/1981 |
| GB | 2335804 A | 9/1999 |
| JP | H11329658 A | 11/1999 |
| JP | 2000084680 A | 3/2000 |
| JP | 2002310117 A | 10/2002 |
| JP | 2008155238 A | 7/2008 |
| WO | 9320382 A1 | 10/1993 |
| WO | 9413040 A1 | 6/1994 |
| WO | 2005104301 A1 | 11/2005 |
| WO | 2009052691 A1 | 4/2009 |

OTHER PUBLICATIONS

"European Examination Report Corresponding to European Patent Application No. 11 843 870.4; Dated: Aug. 18, 2016; 5 Pages".
"European Examination Report corresponding to Patent Application No. 11 843 870.4; Dated: Mar. 10, 2017".
"European Examination Report Corresponding to Patent Application No. 11 843 870.4; Dated: Mar. 10, 2017; 5 Pages".
"Examination Report corresponding to European Application No. 11843870.4 dated Nov. 14, 2017".
"Examination Report corresponding to European Application No. 13853093.6 dated Oct. 18, 2017".
"Examination Report Corresponding to European Patent Application No. 11843118.8 dated Nov. 28, 2018".
"Examination Report Corresponding to European Patent Application No. 11843870.4 dated Nov. 28, 2018".
"Examination Report corresponding to Indian Application No. 2354/DELNP/2014 dated Sep. 7, 2018".
"Examination Report corresponding to Indian Application No. 3912/CHEN/2013 dated Aug. 27, 2018".
"Examination Report corresponding to Indian Patent Application No. 4591/DELNP/2013, dated Aug. 7, 2018".
"Examination Report corresponding to Indian Patent Application No. 4592/DELNP/2013, dated Jul. 23, 2018".
"Examination report under sections 12 & 13 of the Patents Act, 1970 and the Patent Rules, 2003, IN Patent Application No. 4592/DELNP/2013, Jul. 23, 2018, 6 pp.".
"International Search Report and Written Opinion Corresponding to International Application No. PCT/US2011/046054; Feb. 29, 2012".
"International Search Report and Written Opinion Corresponding to International Application No. PCT/US2011/052907; Date of Mailing: Mar. 23, 2012".
"International Search Report and Written Opinion for related PCT Application No. PCT/US2011/046048, date of mailing Feb. 9, 2012".
"International Search Report and Written Opinion for related PCT Application No. PCT/US2011/046048, date of mailing Feb. 9, 2012, 6 pages.".
"International Search Report from related PCT filing PCT/US2011/046051, Feb. 9, 2012".
"International Search Report from related PCT filing PCT/US2011/046052, Apr. 6, 2012".
"Office Action corresponding to Chinese Application No. 201380057933.8 issued Jun. 30, 2016.".
"Office Action corresponding to Indian Application No. 2277/DELNP/2015 dated Jan. 24, 2019".
"Office Action corresponding to Indian Application No. 2354/DELNP/2014 dated Sep. 7, 2018".
"Office Action corresponding to Indian Application No. 2355/DELNP/2014 dated Jan. 23, 2019".
"Office Action corresponding to Indian Application No. 3490/DELNP/2015 dated May 27, 2019".
"Office Action corresponding to Indian Application No. 3530/DELNP/2015 dated Jan. 22, 2019".
"Office Action corresponding to Indian Application No. 3861/DELNP/2015 dated Jan. 31, 2019".
"Office Action corresponding to Indian Application No. 3912/CHENP/2013 dated Aug. 27, 2018".
"Office Action corresponding to Indian Application No. 3975/CHENP/2013 dated Nov. 13, 2018".
"Office Action corresponding to Indian Application No. 4590/DELNP/2013 dated Dec. 1, 2018".
"Office Action corresponding to Indian Application No. 4591/DELNP/2013 dated Aug. 7, 2018".
"Office Action corresponding to Indian Application No. 4592/DELNP/2013 dated Jul. 23, 2018".
"Office Action corresponding to Indian Application No. 4594/DELNP/2013 dated Sep. 27, 2018".
Dupont, "General Design Principles for DuPont Engineering Polymers (Design guide—Module I)", Internet Citation, 2000, page complete, XP007904729, Retrieved from the Internet: http://plastics.dupont.com/plastics/pdflit/americas/general/H76838.pdf [retrieved on May 16, 2008], Chapter 111; pp. 77-90.

* cited by examiner

ULTRASONIC WELD INTERCONNECTION COAXIAL CONNECTOR AND INTERCONNECTION WITH COAXIAL CABLE

CROSS REFERENCE TO RELATED APPLICATIONS

This application is a continuation of and claims priority to U.S. Utility patent application Ser. No. 17/935,380, titled "Ultrasonic Weld Interconnection Coaxial Connector and Interconnection With Coaxial Cable" filed Sep. 26, 2022, issued Sep. 12, 2023 as U.S. Pat. No. 11,757,212 and hereby incorporated by reference in the entirety, which is a continuation of and claims priority to U.S. Utility patent application Ser. No. 17/079,047, titled "Ultrasonic Weld Interconnection Coaxial Connector and Interconnection With Coaxial Cable" filed Oct. 23, 2020, issued Oct. 4, 2022 as U.S. Pat. No. 11,462,843 and hereby incorporated by reference in the entirety, which is a continuation of and claims priority to U.S. Utility patent application Ser. No. 16/879,926, titled "Ultrasonic Weld Interconnection Coaxial Connector and Interconnection With Coaxial Cable" filed May 21, 2020, issued Oct. 27, 2020 as U.S. Pat. No. 10,819,046 and hereby incorporated by reference in the entirety, which is a continuation of and claims priority to U.S. Utility patent application Ser. No. 15/693,974, titled "Ultrasonic Weld Interconnection Coaxial Connector and Interconnection With Coaxial Cable" filed Sep. 1, 2017 by Kendrick Van Swearingen, issued May 26, 2020 as U.S. Pat. No. 10,665,967 and hereby incorporated by reference in the entirety, which is a continuation of commonly owned U.S. Utility patent application Ser. No. 13/712,289, titled "Ultrasonic Weld Interconnection Coaxial Connector and Interconnection With Coaxial Cable" filed Dec. 12, 2012 by Kendrick Van Swearingen, issued Sep. 5, 2017 as U.S. Pat. No. 9,755,328 and hereby incorporated by reference in the entirety, which is a divisional of commonly owned U.S. Utility patent application Ser. No. 13/161,326, titled "Method for Ultrasonic Welding a Coaxial Cable to a Coaxial Connector and" filed Jun. 15, 2011 by Kendrick Van Swearingen, issued Feb. 5, 2013 as U.S. Pat. No. 8,365,404 and hereby incorporated by reference in the entirety, which is a continuation-in-part of commonly owned U.S. Utility patent application Ser. No. 12/980,013, titled "Method of Interconnecting a Coaxial Connector to a Coaxial Cable Via Ultrasonic Welding" filed Dec. 28, 2010 by Kendrick Van Swearingen, issued Jun. 4, 2013 as U.S. Pat. No. 8,453,320 and hereby incorporated by reference in its entirety. This application is also a continuation-in-part of commonly owned U.S. Utility patent application Ser. No. 12/974,765, titled "Friction Weld Inner Conductor Cap and Interconnection Method" filed Dec. 21, 2010 by Kendrick Van Swearingen, issued Oct. 22, 2013 as U.S. Pat. No. 8,563,861 and hereby incorporated by reference in its entirety. U.S. Utility patent application Ser. No. 12/980,013 and Ser. No. 12/974,765 are each a continuation-in-part of commonly owned U.S. Utility patent application Ser. No. 12/951,558, titled "Laser Weld Coaxial Connector and Interconnection Method", filed Nov. 22, 2010 by Ronald A. Vaccaro, Kendrick Van Swearingen, James P. Fleming, James J. Wlos and Nahid Islam, issued Sep. 9, 2014 as U.S. Pat. No. 8,826,525 and hereby incorporated by reference in its entirety.

BACKGROUND

Field of the Invention

This invention relates to electrical cable connectors. More particularly, the invention relates to a coaxial connector and method and apparatus for interconnection of such coaxial cable connector with a coaxial cable via ultrasonic welding wherein the interconnection may be performed with a single fixture mounting operation.

Description of Related Art

Coaxial cable connectors are used, for example, in communication systems requiring a high level of precision and reliability.

To create a secure mechanical and optimized electrical interconnection between the cable and the connector, it is desirable to have generally uniform, circumferential contact between a leading edge of the coaxial cable outer conductor and the connector body. A flared end of the outer conductor may be clamped against an annular wedge surface of the connector body via a coupling body. Representative of this technology is commonly owned U.S. Pat. No. 6793529 issued Sep. 21, 2004 to Buenz. Although this type of connector is typically removable/re-useable, manufacturing and installation is complicated by the multiple separate internal elements required, interconnecting threads and related environmental seals.

Connectors configured for permanent interconnection via solder and/or adhesive interconnection are also well known in the art. Representative of this technology is commonly owned U.S. Pat. No. 5802710 issued Sep. 8, 1998 to Bufanda et al. However, solder and/or adhesive interconnections may be difficult to apply with high levels of quality control, resulting in interconnections that may be less than satisfactory, for example when exposed to vibration and/or corrosion over time.

Passive Intermodulation Distortion, also referred to as PIM, is a form of electrical interference/signal transmission degradation that may occur with less than symmetrical interconnections and/or as electro-mechanical interconnections shift or degrade over time, for example due to mechanical stress, vibration, thermal cycling and/or material degradation. PIM is an important interconnection quality characteristic as PIM from a single low quality interconnection may degrade the electrical performance of an entire RF system.

During interconnection procedures, the coaxial connector and/or coaxial connector may be mounted in a fixture which secures the connector and/or cable in a secure pre-determined orientation with respect to one another. Depending upon the type of interconnection, multiple fixtures and/or mounting/remounting may be required to perform separate portions of the interconnection procedure, such as separately forming secure electro-mechanical interconnections with respect to each of the inner and outer conductors of the coaxial cable. However, each mounting/remounting procedure consumes additional time and/or may provide opportunities for the introduction of alignment errors.

Competition in the coaxial cable connector market has focused attention on improving electrical performance and long term reliability of the cable to connector interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Aluminum has been applied as a cost-effective alternative to copper for the conductors in coaxial cables. However, aluminum oxide surface coatings quickly form upon air-exposed aluminum surfaces. These aluminum oxide surface coatings may degrade traditional mechanical, solder and/or conductive adhesive interconnections.

The inventor has recognized that increasing acceptance of coaxial cable with solid outer and/or inner conductors of aluminum and/or aluminum alloy enables connectors configured for interconnection via ultrasonic welding between the outer and inner conductors and a respective connector body and/or inner conductor cap inner contact which may each also be cost effectively provided, for example, formed from aluminum and/or aluminum alloy.

Further with respect to the inner conductor interconnection, the inventor has identified several difficulties arising from the interconnection of aluminum inner conductor coaxial cable configurations with prior coaxial cable connectors having inner contact configurations. Prior coaxial connector mechanical interconnection inner contact configurations are generally incompatible with aluminum inner conductors due to the creep characteristics of aluminum. Further, galvanic corrosion between the aluminum inner conductor and a dissimilar metal of the inner contact, such as bronze, brass or copper, may contribute to accelerated degradation of the electro-mechanical interconnection.

Utilizing friction welding, such as ultrasonic welding, for both the outer conductor to connector body and inner conductor to inner conductor cap interconnections enables a molecular bond interconnection with inherent resistance to corrosion and/or material creep interconnection degradation. Further, a molecular bond interconnection essentially eliminates the opportunity for PIM generation due to shifting and/or degrading mechanical interconnections.

An ultrasonic weld may be formed by applying ultrasonic vibrations under pressure in a join zone between two parts desired to be welded together, resulting in local heat sufficient to plasticize adjacent surfaces that are then held in contact with one another until the interflowed surfaces cool, completing the weld. An ultrasonic weld may be applied with high precision via a sonotrode and/or simultaneous sonotrode ends to a point and/or extended surface. Where a point ultrasonic weld is applied, successive overlapping point welds may be applied to generate a continuous ultrasonic weld.

Ultrasonic vibrations may be applied, for example, in a linear direction and/or reciprocating along an arc segment, known as torsional vibration.

Because the localized abrasion of the ultrasonic welding process can break up any aluminum oxide surface coatings in the immediate weld area, no additional treatment may be required with respect to removing or otherwise managing the presence of aluminum oxide on the interconnection surfaces.

Figure 1:
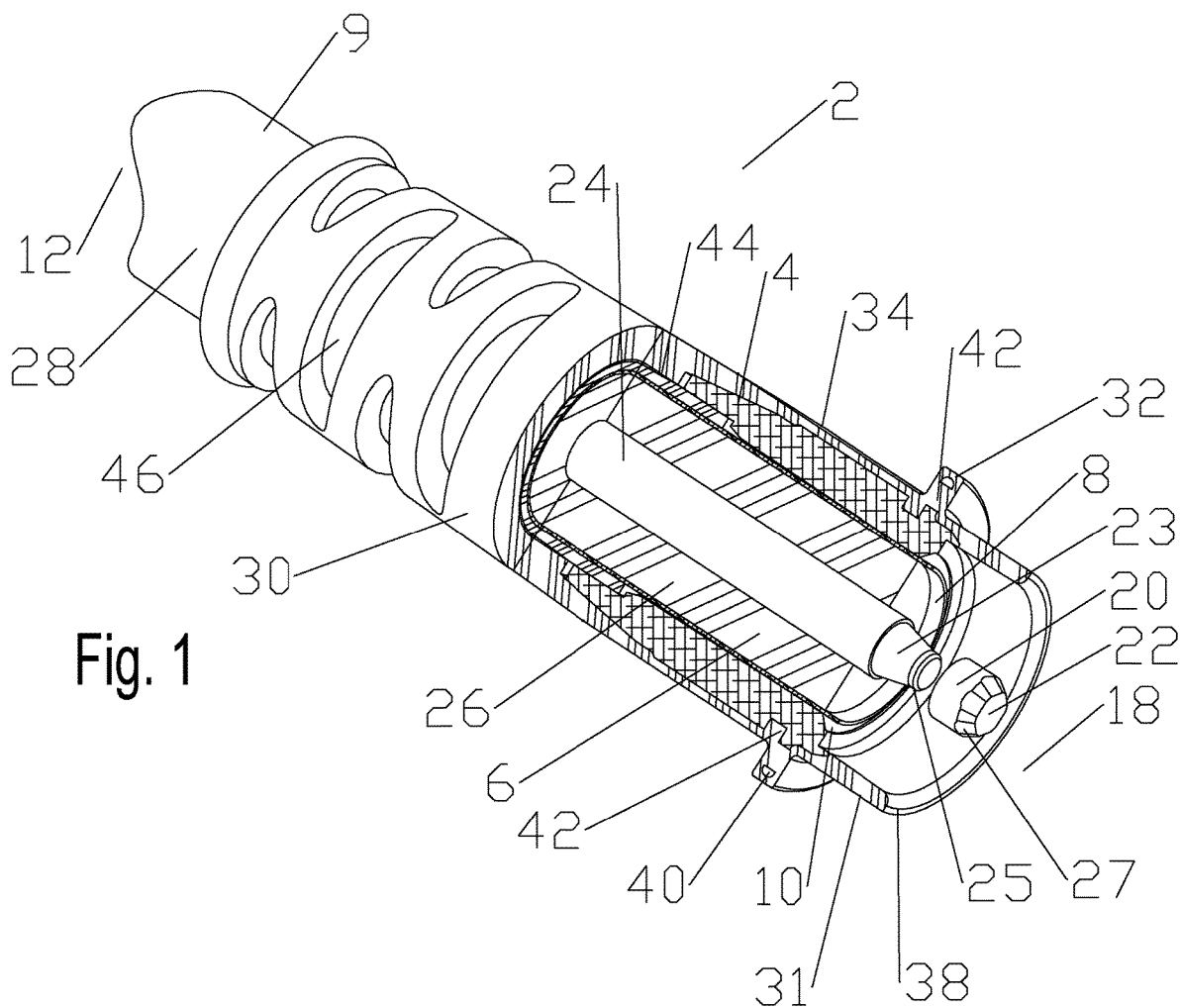
FIG. 1 is a schematic partial cut-away external isometric view of an exemplary embodiment of a coaxial cable inserted through a coaxial connector and an inner conductor cap shown spaced away from the end of the inner conductor, prior to imitating connector-to-cable interconnection.
Figure 2:
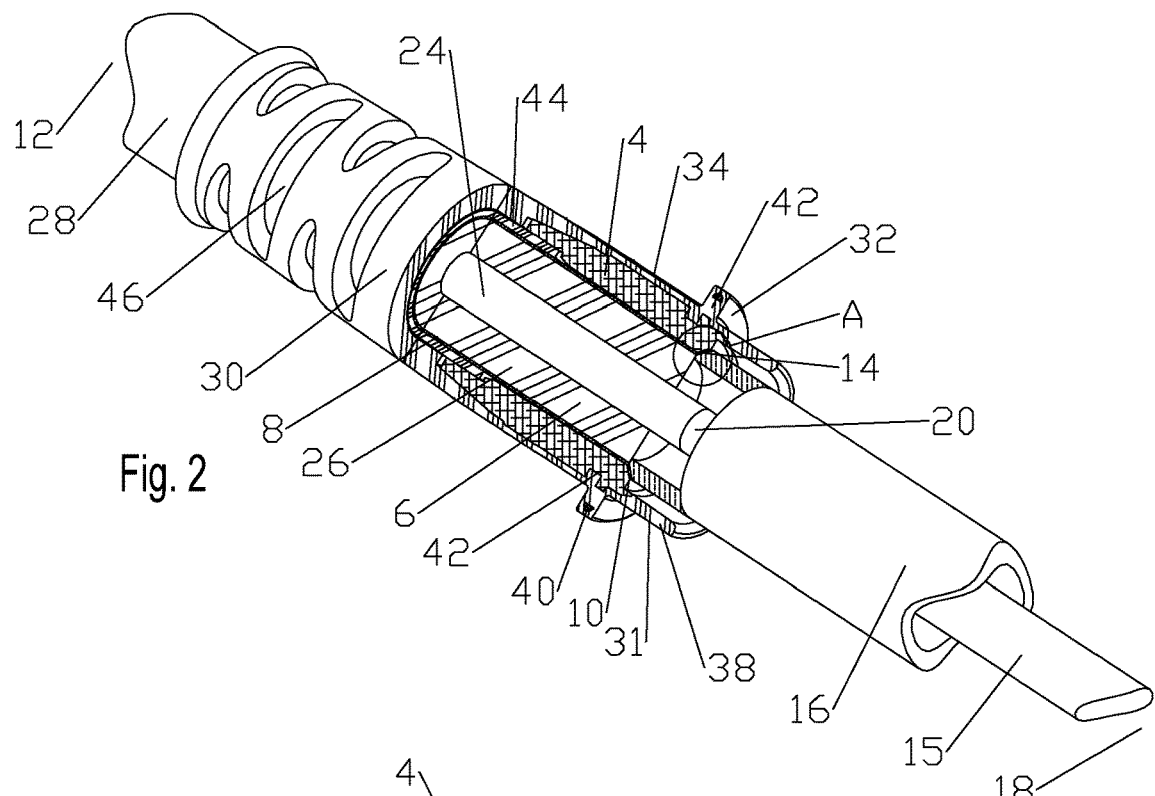
FIG. 2 is a schematic partial cut-away isometric view of the coaxial connector of FIG. 1 with the outer conductor sonotrode flaring the leading edge of the outer conductor against the flare seat.
Figure 3:
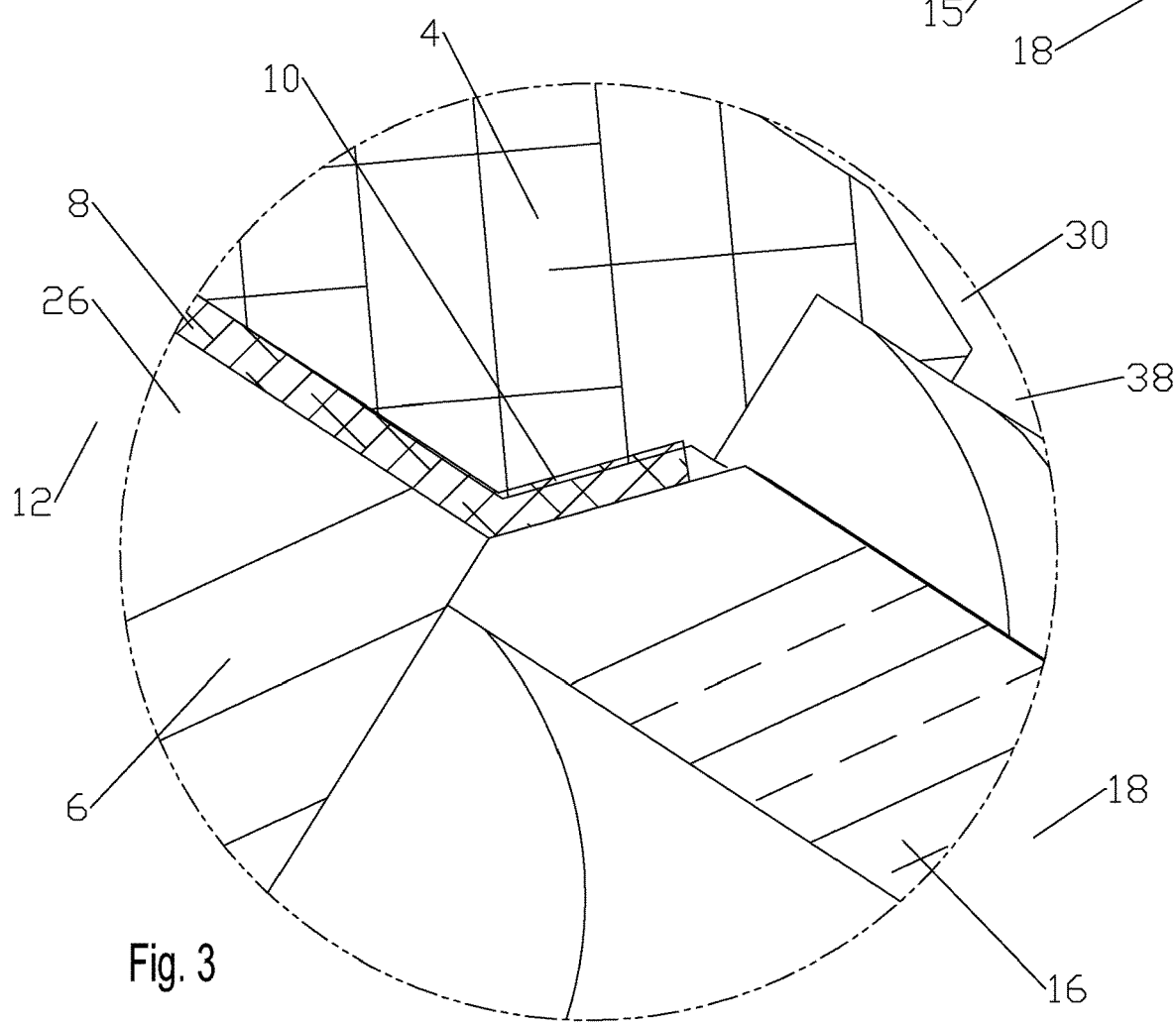
FIG. 3 is a close-up view of area A of FIG. 2.

Exemplary embodiments of an inner and outer conductor ultrasonic weldable coaxial connector 2 are demonstrated in FIGS. 1-7. As best shown in FIG. 1, a unitary connector body 4 is provided with a bore 6 dimensioned to receive the outer conductor 8 of a coaxial cable 9 therein. As best shown in FIG. 3, a flare seat 10 angled radially outward from the bore 6 toward a connector end 18 of the connector body 4 is open to the connector end of the coaxial connector 2 providing a mating surface to which a leading end flare 14 of the outer conductor 8 may be ultrasonically welded by an outer conductor sonotrode 16 of an ultrasonic welder inserted to contact the leading end flare 14 from the connector end 18.

One skilled in the art will appreciate that connector end 18 and cable end 12 are applied herein as identifiers for respective ends of both the coaxial connector 2 and also of discrete elements of the coaxial connector 2 and sontotrodes described herein, to identify same and their respective interconnecting surfaces according to their alignment along a longitudinal axis of the connector between a connector end 18 and a cable end 12.

Prior to interconnection via ultrasonic welding, the leading end of the coaxial cable 9 may be prepared, as best shown in FIG. 1, by cutting the coaxial cable 9 so that the inner conductor 24 extends from the outer conductor 8. Also, dielectric material 26 between the inner conductor 24 and outer conductor 8 may be stripped back and a length of the outer jacket 28 removed to expose desired lengths of each.

The inner conductor 24 extending from the prepared end of the coaxial cable 9 may be selected to pass through to the connector end 18 as a portion of the selected connection interface 31. If the selected coaxial cable 9 has an inner conductor 24 that has a larger diameter than the inner conductor portion of the selected connector interface 31, the inner conductor 24 may be ground at the connector end 18 to the required diameter.

Although a direct pass through inner conductor 24 advantageously eliminates interconnections, for example with the spring basket interconnection with a traditional coaxial connector inner contact, such may introduce electrical performance degradation such as PIM. Where the inner conductor 24 is also aluminum material some applications may require a non-aluminum material connection point at the inner contact/inner conductor of the connection interface 31. As shown for example in FIG. 1, an inner conductor cap 20, for example formed from a metal such as brass or other desired metal, may be applied to the end of the inner conductor 24, also by friction welding such as ultrasonic welding.

The inner conductor cap 20 may be provided with an inner conductor socket at the cable end 12 and a desired inner conductor interface 22 at the connector end 4. The inner conductor socket may be dimensioned to mate with a prepared end 23 of an inner conductor 24 of a coaxial cable 9. To apply the inner conductor cap 20, the end of the inner conductor 24 is ground to provide a pin corresponding to the selected socket geometry of the inner conductor cap 20. To allow material inter-flow during welding attachment, the socket geometry of the inner conductor cap 20 and/or the end of the inner conductor 24 may be formed to provide a material gap 25.

A rotation key 27 may be provided upon the inner conductor cap 20, the rotation key 27 dimensioned to mate with an inner sonotrode tool 15 for rotating and/or torsionally reciprocating the inner conductor cap 20, for interconnection via ultrasonic friction welding.

The cable end 12 of the coaxial cable 9 is inserted through the bore 6 and an annular flare operation is performed on a leading edge of the outer conductor 8. The resulting leading end flare 14 may be angled to correspond to the angle of the flare seat 10 with respect to a longitudinal axis of the coaxial connector 2. By performing the flare operation against the flare seat 10, the resulting leading end flare 14 can be formed with a direct correspondence to the flare seat angle. The flare operation may be performed utilizing the leading edge of the outer conductor sonotrode 16, provided with a conical cylindrical inner lip with a connector end 18 diameter less than an inner diameter of the outer conductor 8, for initially engaging and flaring the leading edge of the outer conductor 8 against the flare seat 10.

An overbody 30, as shown for example in FIG. 1, may be applied to the connector body 4 as an overmolding of polymeric material. The overbody 30 increases cable to connector torsion and pull resistance.

Figure 8:
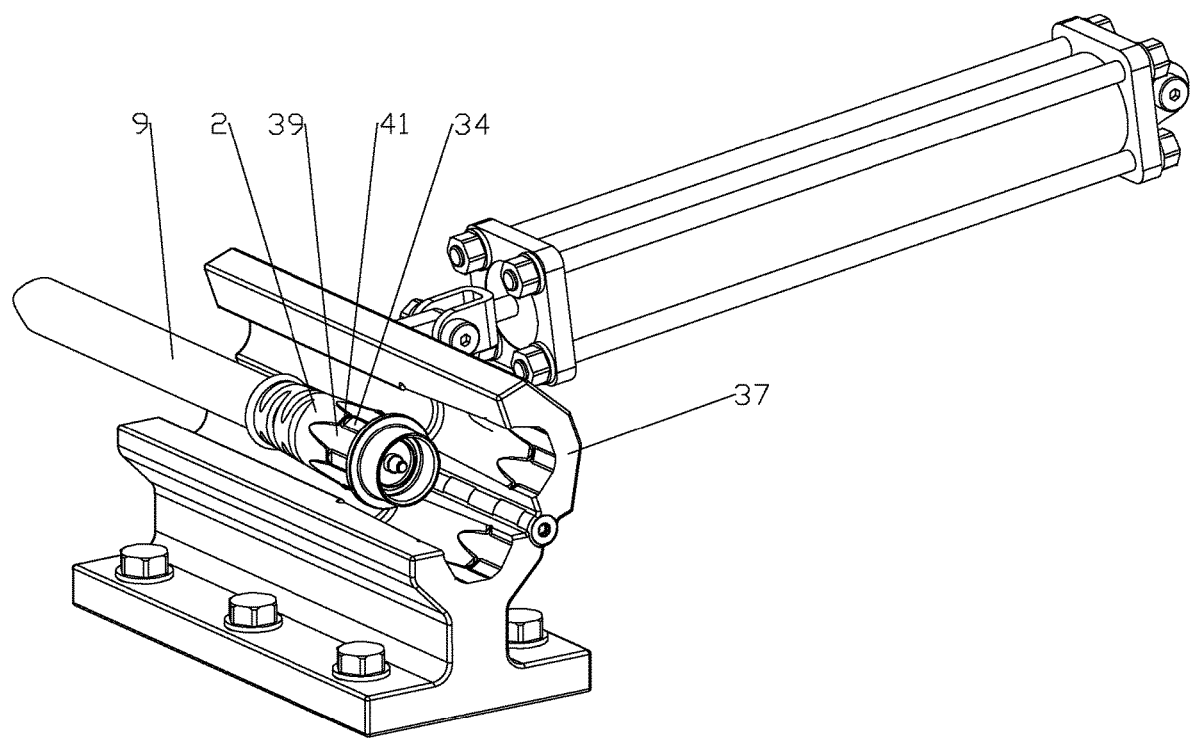
FIG. 8 is a schematic isometric view of a coaxial cable and coaxial connector ready for insertion into a fixture.

Depending upon the applied connection interface 31, demonstrated in the exemplary embodiments herein as a standard 7/16 DIN male interface, the overbody 30 may be provided dimensioned with an outer diameter cylindrical support surface 34 and/or support ridges depending upon the diameter of the selected coaxial cable. Tool flats 39 (see FIG. 8) for retaining the coaxial connector 2 during interconnection with other cables and/or devices may be formed in the cylindrical support surface 34 by removing surface sections of the cylindrical support surface 34.

The coupling nut 36 is retained upon the support surface 34 and/or support ridges at the connector end 18 by an overbody flange 32. At the cable end 12, the coupling nut 36 may be retained upon the cylindrical support surface 34 and/or support ridges of the overbody 30 by applying one or more retention spurs 41 (see FIG. 8) proximate the cable end of the cylindrical support surface 34. The retention spurs 41 are angled with increasing diameter from the cable end 12 to the connector end 18, allowing the coupling nut 36 to be passed over them from the cable end 12 to the connector end 18, but then retained upon the cylindrical support surface 34 by a stop face provided at the connector end 18 of the retention spurs 41.

The overbody 30 may also provide connection interface structure at the connector end 18 and further reinforcing support at the cable end 12, enabling reductions in the size of the connector body 4, thereby potentially reducing overall material costs. For example, the overbody 30 is demonstrated extending from the connector end 18 of the connector body 4 to provide portions of the selected connector interface 31, an alignment cylinder 38 of the 7/16 DIN male interface, further reducing metal material requirements of the connector body 4.

The overbody flange 32 may be securely keyed to a connector body flange 40 of the connector body 4 and thereby with the connector body 4 via one or more interlock apertures 42 such as holes, longitudinal knurls, grooves, notches or the like provided in the connector body flange 40 and/or outer diameter of the connector body 4, as shown for example in FIG. 1. Thereby, as the polymeric material of the overbody 30 flows into the one or more interlock apertures 42 during overmolding, upon curing the overbody 30 is permanently coupled to and rotationally interlocked with the connector body 4.

The cable end of the overbody 30 may be dimensioned with an inner diameter friction surface 44 proximate that of the coaxial cable jacket 28, enabling, for example, an interference fit and/or polymeric friction welding between the overbody 30 and the jacket 28, by rotation of the connector body 4 with respect to the outer conductor 8, thereby eliminating the need for environmental seals at the cable end 12 of the connector/cable interconnection.

The overbody 30 may also have an extended cable portion proximate the cable end provided with a plurality of stress relief apertures 46. The stress relief apertures 46 may be formed in a generally elliptical configuration with a major axis of the stress relief apertures 46 arranged normal to the longitudinal axis of the coaxial connector 2. The stress relief apertures 46 enable a flexible characteristic of the cable end of the overbody 30 that increases towards the cable end of the overbody 30. Thereby, the overbody 30 supports the interconnection between the coaxial cable 9 and the coaxial connector 2 without introducing a rigid end edge along which a connected coaxial cable 2 subjected to bending forces may otherwise buckle, which may increase both the overall strength and the flexibility characteristics of the interconnection.

Where the overbody 30 is interconnected with the jacket 28 via friction welding, friction between the friction surface 44 and the outer diameter of the jacket 28 heats the respective surfaces to a point where they begin to soften and intermingle, sealing them against one another. The jacket 28 and and/or the inner diameter of the overbody 30 may be provided as a series of spaced apart annular peaks of a contour pattern such as a corrugation, or a stepped surface, to provide enhanced friction, allow voids for excess friction weld material flow and/or add key locking for additional strength. Alternatively, the overbody 30 may be sealed against the outer jacket 28 with an adhesive/sealant or may be overmolded upon the connector body 4 after interconnection with the outer conductor 8, the heat of the injected polymeric material bonding the overbody 30 with and/or sealing against the jacket 28.

Figure 9:
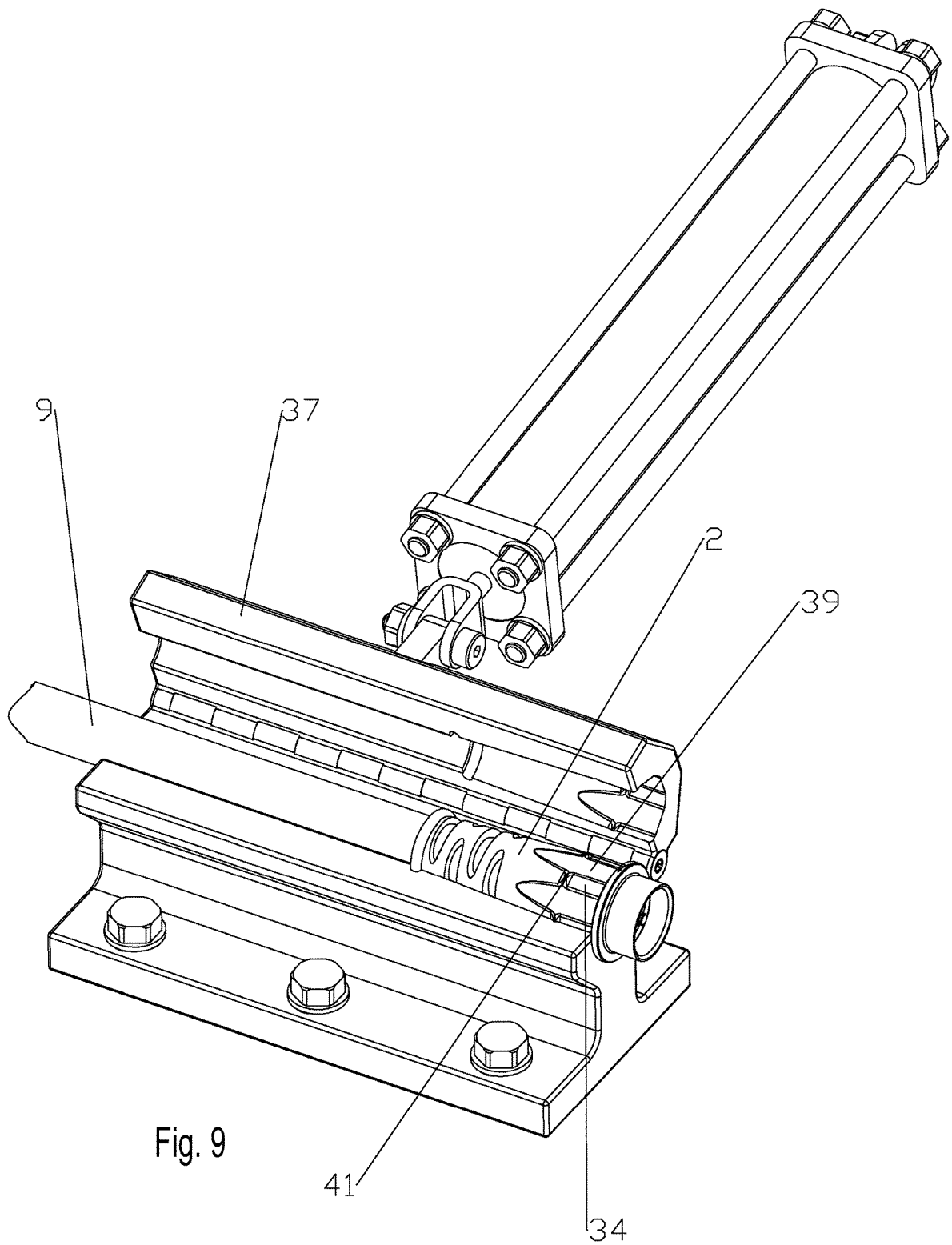
FIG. 9 is a schematic isometric view of the fixture of FIG. 8, with the coaxial cable and the coaxial connector seated in the fixture.
Figure 10:
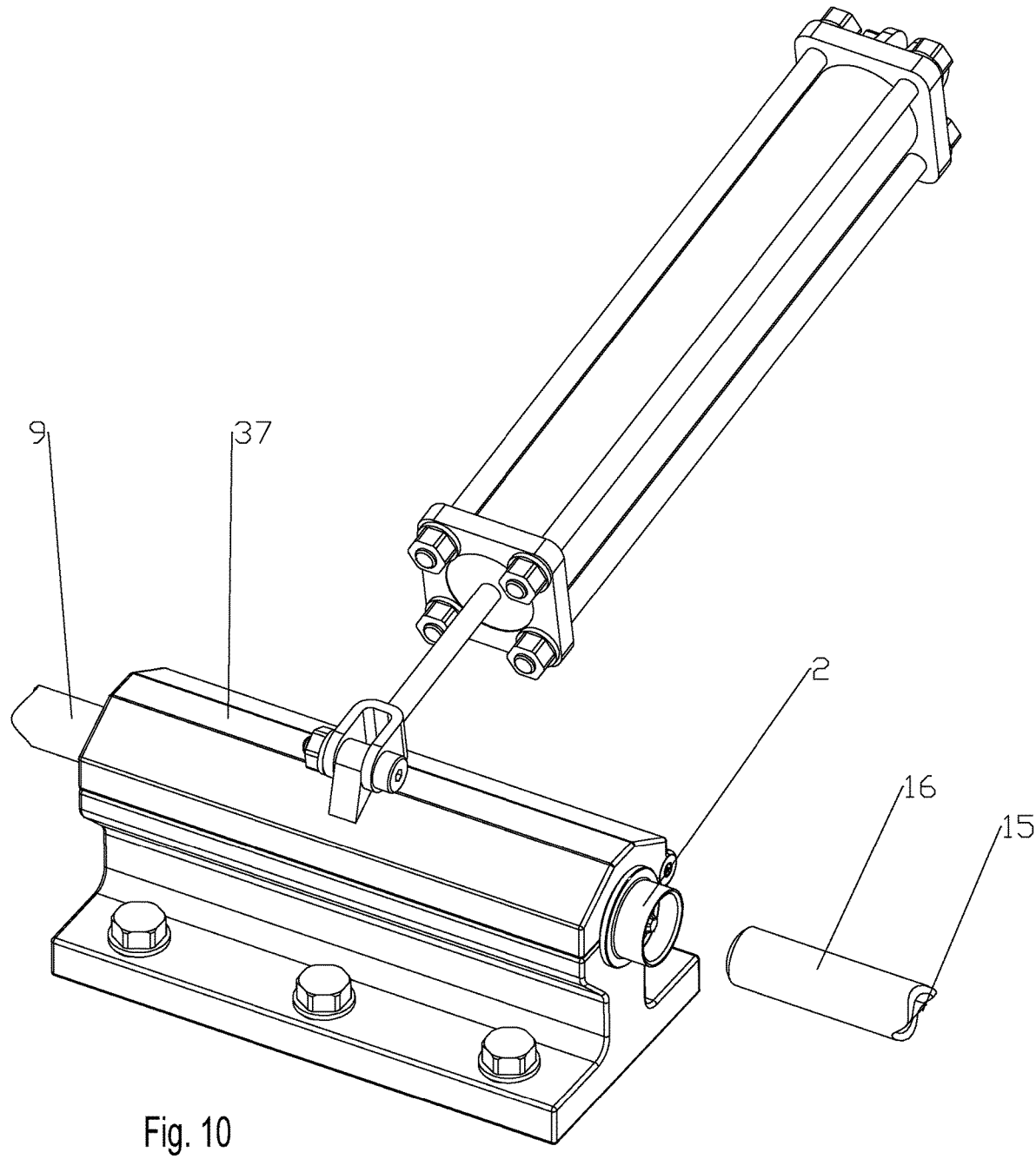
FIG. 10 is a schematic isometric view of the fixture of FIG. 8, closed around the coaxial cable and the coaxial connector, ready for flaring and/or ultrasonic welding via the coaxial inner and outer conductor sonotrodes.

In a method for cable and connector interconnection, the prepared end of the coaxial cable 9 is inserted through the coupling nut 36 (the coupling nut 36 is advanced along the coaxial cable 9 out of the way until interconnection is completed) and connector body bore 6 so that the outer conductor 8 extends past the flare seat 10 a desired distance. The connector body 4 and/or cable end of the overbody 30 may be coated with an adhesive prior to insertion, and/or a spin welding operation may be performed to fuse the overbody 30 and/or cable end of the connector body 4 with the jacket 28. The connector body 4 and coaxial cable 9 are then retained in a fixture 37, rigidly securing these elements for the flaring and electrical interconnection friction welding via ultrasonic welding steps. One skilled in the art will appreciate that the fixture may be any manner of releasable retention mechanism into which the coaxial cable and/or coaxial connector 2 may be easily inserted and then released, for example as demonstrated in FIGS. 8-10.

Figure 4:
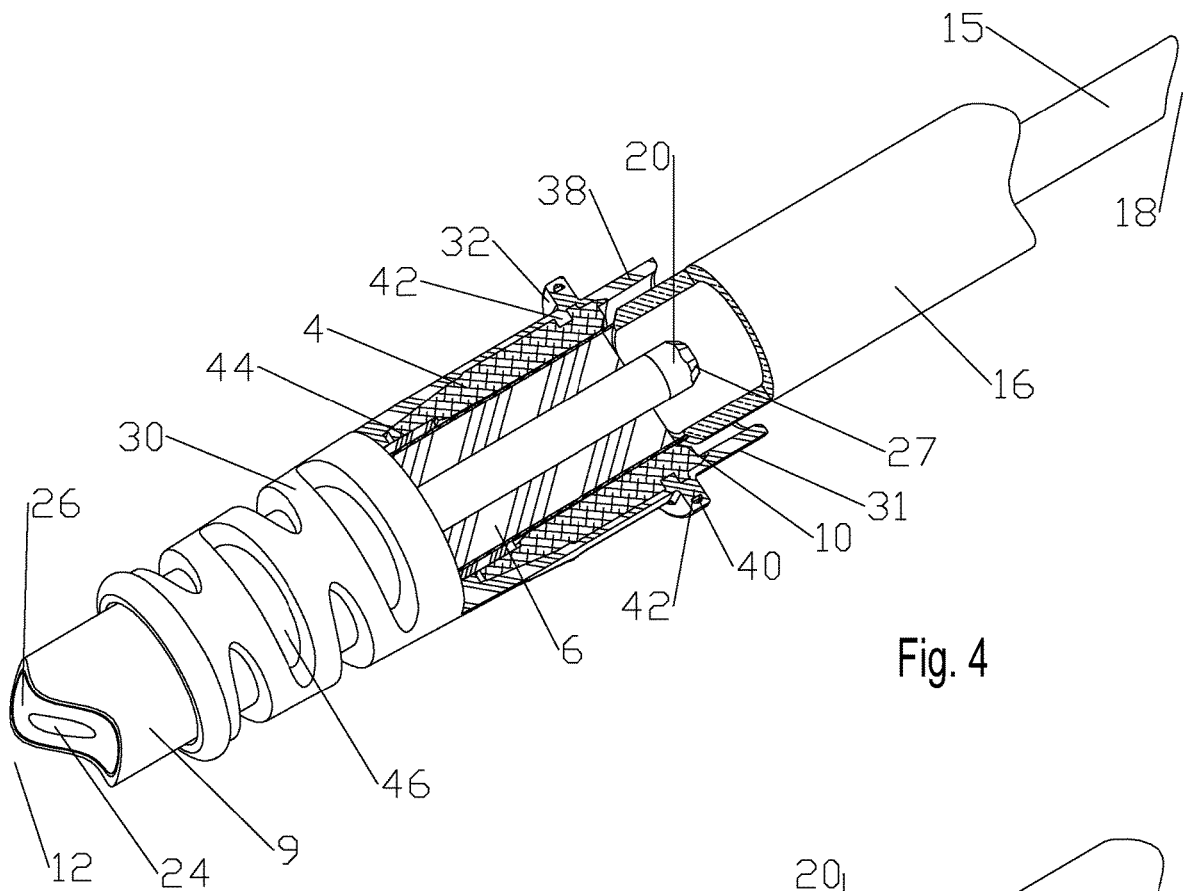
FIG. 4 is a schematic partial cut-away isometric view of the coaxial connector of FIG. 1 with the outer conductor sonotrode advanced to initiate the flaring of the leading edge of the outer conductor against the flare seat.

The flaring operation may be performed with a separate flare tool or via advancing the outer conductor sonotrode 16 to contact the leading edge of the head of the outer conductor 8, as shown for example in FIG. 4, resulting in flaring the leading edge of the outer conductor 8 against the flare seat 10 (See FIG. 3). Once flared, the outer conductor sonotrode 16 is advanced (if not already so seated after flaring is completed) upon the leading end flare 14 and ultrasonic welding may be initiated.

Ultrasonic welding may be performed, for example, utilizing linear and/or torsional vibration. In linear vibration ultrasonic-type friction welding of the leading end flare 14 to the flare seat 10, a linear vibration is applied to a cable end side of the leading end flare 14, while the coaxial connector 2 and flare seat 10 therewithin are held static within the fixture 37. The linear vibration generates a friction heat which plasticizes the contact surfaces between the leading end flare 14 and the flare seat 10. Where linear vibration ultrasonic-type friction welding is utilized, a suitable frequency and linear displacement, such as between 20 and 40 KHz and 20-35 microns, selected for example with respect to a material characteristic, diameter and/or sidewall thickness of the outer conductor 8, may be applied.

With the outer conductor interconnection completed, the outer diameter sonotrode head may be advanced into supporting contact against the leading end flare 14 of the outer conductor 8, further improving the immobilization of the coaxial cable 9 and coaxial connector 2.

Figure 5:
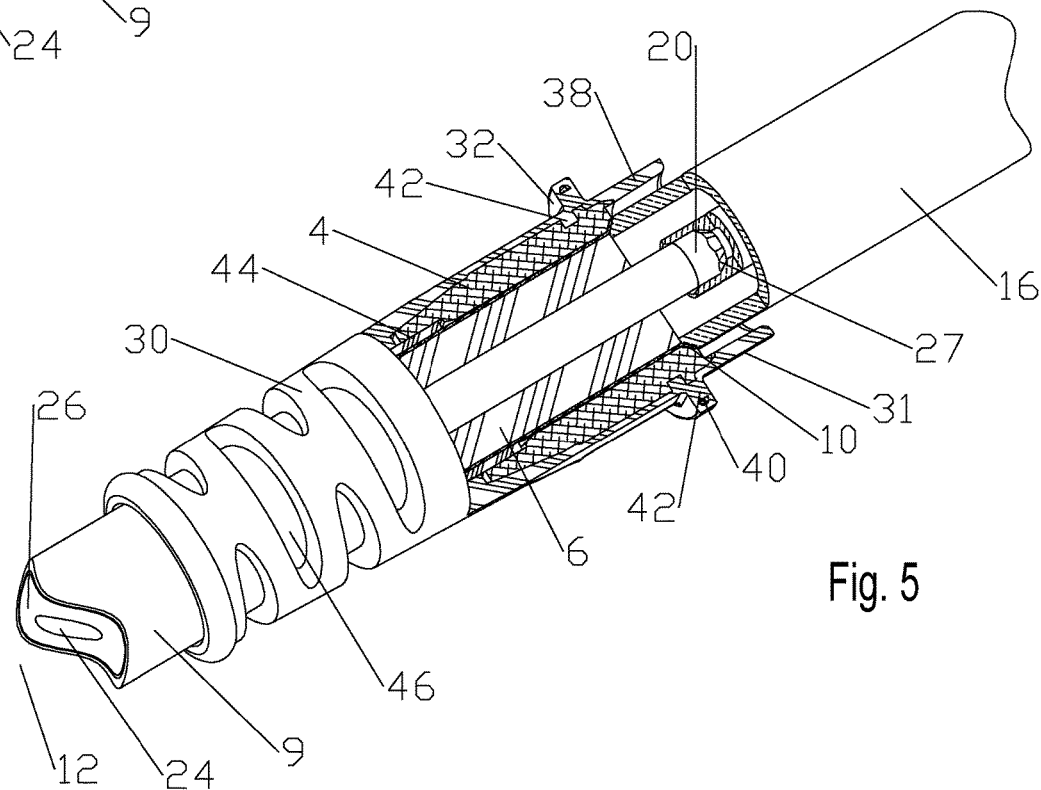
FIG. 5 is a schematic partial cut-away isometric view of the coaxial connector of FIG. 1 with the outer conductor sonotrode seated upon the leading end flare and the inner conductor sonotrode advanced to initiate ultrasonic welding of the inner conductor cap upon the inner conductor.
Figure 6:
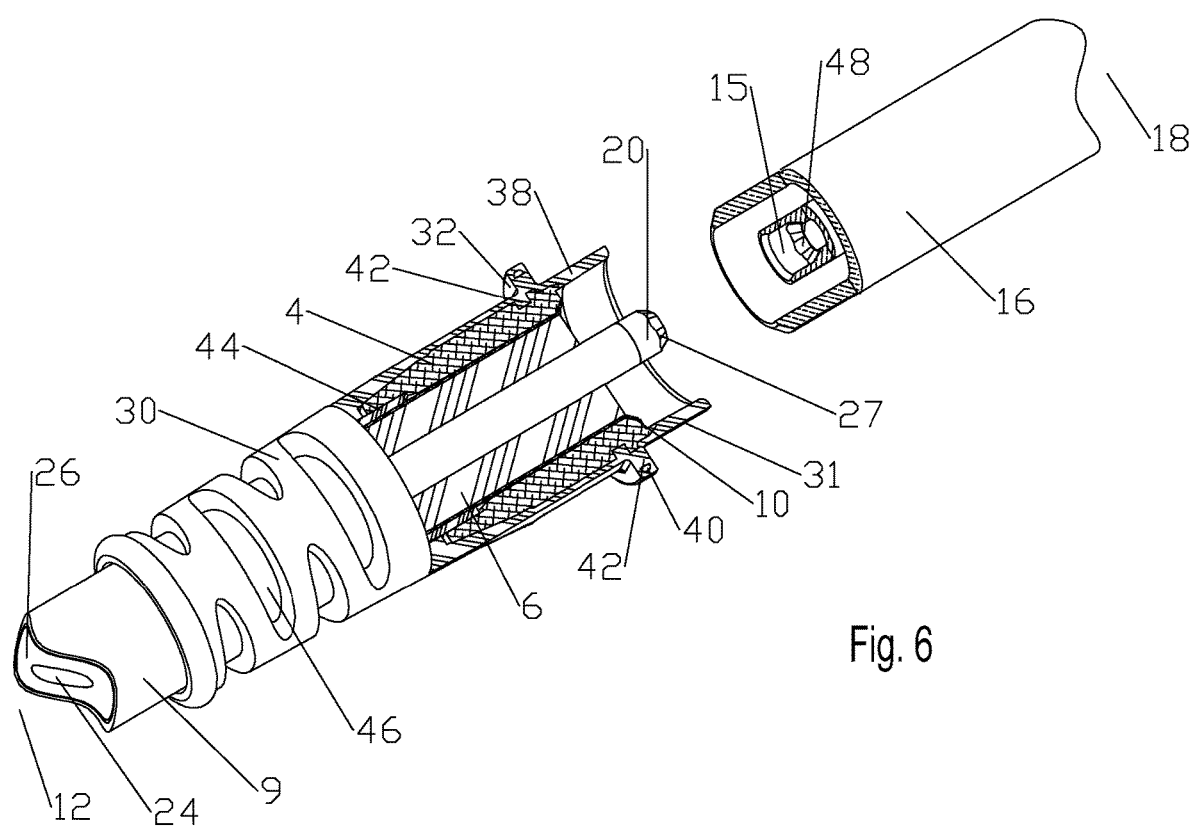
FIG. 6 is a schematic partial cut-away isometric view of the coaxial connector of FIG. 1 with the inner conductor and outer conductor sonotrodes retracted.

As shown in FIG. 5, within a bore of the outer conductor sonotrode 16, the inner conductor sonotrode 15 is then advanced to friction weld the inner conductor cap 20 upon the prepared end 23 of the inner conductor 24. Because the outer conductor sonotrode 16 and the inner conductor sonotrode 15 are arranged coaxially, alignment with the desired coaxial elements of the coaxial cable 9 is ensured, without requiring adjustment of the coaxial cable 9 and/or coaxial connector 2 within the fixture 37.

The inner conductor cap 20 may have been pre-inserted upon the prepared end 23 of the inner conductor 24 or alternatively may be provided loaded into the cable end of the inner conductor sonotrode 15. The inner conductor sonotrode 15 may include a key feature 48 configured to receive and engage the rotation key 27 of the inner conductor cap 20. Utilizing the key feature 48 to drive the inner conductor cap 20, torsional vibration ultrasonic-type friction welding may be applied.

In torsional vibration ultrasonic-type friction welding, a torsional vibration is applied to the interconnection via the inner conductor sonotrode 15 coupled to the inner conductor cap 20 by the rotation key 27, while the coaxial connector 2 and coaxial cable 9 with inner conductor 24 there within are held static within the fixture 37. The torsional vibration generates a friction heat which plasticizes the contact surfaces between the prepared end 23 and the inner conductor cap 20. Where torsional vibration ultrasonic-type friction welding is utilized, a suitable frequency and torsional vibration displacement, for example between 20 and 40 KHz and 20-35 microns, may be applied, also selected with respect to material characteristics and/or dimensions of the mating surfaces.

Alternatively, the inner conductor sonotrode 15 may be applied to interconnect the inner conductor cap 20 and prepared end 23 of the inner conductor 24 and the outer conductor sonotrode 16 then advanced coaxially around the inner conductor sonotrode 15 to perform flaring of the outer conductor leading end flare 14 and/or ultrasonic friction weld interconnection.

Where the outer conductor and inner conductor sonotrodes 16, 15 are independent of one another during operation, a vibration profile comprising a vibration type, frequency and/or amplitude selected according to the requirements of each type of interconnection may be applied. If desired, both the inner conductor and outer conductor sonotrodes 15, 16 may be applied, either with the same vibration profile or separate vibration profiles, simultaneously to further reduce the interconnection time requirements.

As shown for example in FIG. 5, when the interconnection is completed, the inner conductor and outer conductor sonotrodes 15, 16 may be withdrawn and the interconnected coaxial cable 9 and coaxial connector 2 released from the fixture 37.

Figure 7:
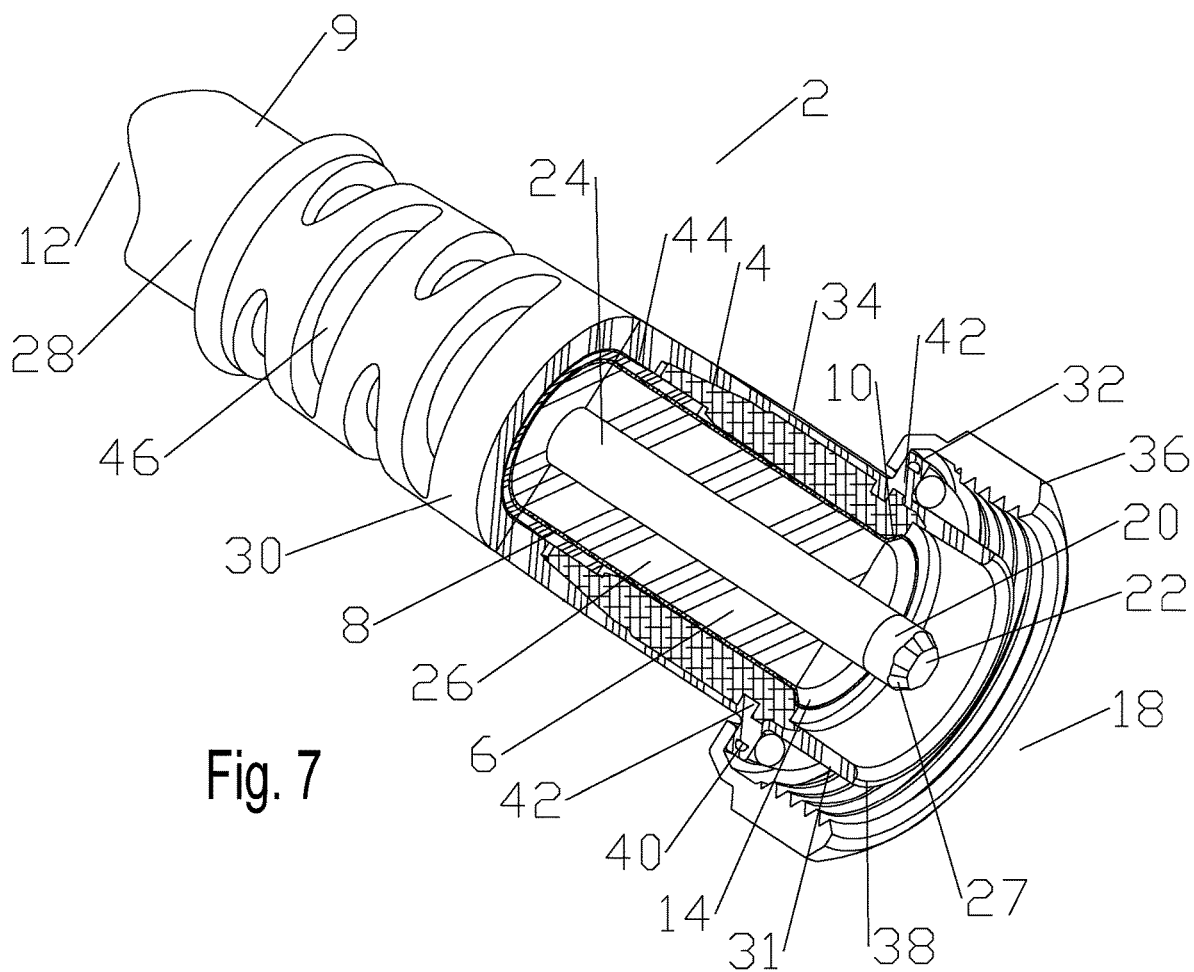
FIG. 7 is a schematic partial cut-away isometric view of the coaxial connector of FIG. 1 with interconnection completed.

With the coupling nut 36 advanced over the overbody 30 to a ready for interconnection position against the overbody flange 32, the interconnection has been completed, as best shown in FIG. 7.

One skilled in the art will appreciate that the coaxial connector 2 and interconnection method disclosed has significant material cost efficiencies and provides a permanently sealed interconnection with reduced size and/or weight requirements. Because of the coaxial sonotrode configuration, the coaxial cable 9 and coaxial connector 2 need to be mounted in the fixture 37 only once, which simplifies the electrical interconnection procedure. Thereby, the single fixturing feature of the flaring and electrical interconnection method may increase the speed of manufacture and/or improve alignment of the resulting interconnection. Finally, because a molecular bond is established at each electro-mechanical interconnection, PIM resulting from such interconnections may be significantly reduced and/or entirely eliminated.

| Table of Parts | |
|---|---|
| 2 | coaxial connector |
| 4 | connector body |
| 6 | bore |
| 8 | outer conductor |
| 9 | coaxial cable |
| 10 | flare seat |
| 12 | cable end |
| 14 | leading end flare |
| 15 | inner conductor sonotrode |
| 16 | outer conductor sonotrode |
| 18 | connector end |
| 20 | inner conductor cap |
| 22 | inner conductor interface |
| 23 | prepared end |
| 24 | inner conductor |
| 25 | material gap |

-continued

Table of Parts

| | |
|---|---|
| 26 | dielectric material |
| 27 | rotation key |
| 28 | jacket |
| 30 | overbody |
| 31 | connection interface |
| 32 | overbody flange |
| 34 | support surface |
| 36 | coupling nut |
| 37 | fixture |
| 38 | alignment cylinder |
| 39 | tool flat |
| 40 | connector body flange |
| 41 | retention spur |
| 42 | interlock aperture |
| 44 | friction surface |
| 46 | stress relief aperture |
| 48 | key feature |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A coaxial cable-connector assembly comprising:
   a. a coaxial cable comprising an elongate inner conductor and an elongate outer conductor circumferentially surrounding the inner conductor, and an elongate dielectric layer interposed between the inner conductor and the outer conductor, wherein the outer conductor has a leading end; and
   b. a coaxial connector comprising:
      an inner contact having a first end electrically connected to the inner conductor of the coaxial cable, and a second distal end;
      a connector body having a first end that surrounds the leading end of the coaxial cable and a cylindrical distal end that surrounds the second distal end of the inner contact;
   wherein an electrical path is formed between the leading end of the outer conductor on the coaxial cable and the cylindrical distal end, and wherein a circumferential welded seam is located along the electrical path.

2. The assembly defined in claim 1, wherein the circumferential welded seam is formed directly between the leading end of the coaxial cable and the first end of the connector body.

3. The assembly defined in claim 1, further comprising an overbody that circumferentially overlies the connector body.

4. The assembly defined in claim 1, wherein the coaxial connector presents a standard 7/16 DIN male interface.

5. The assembly defined in claim 1, wherein the outer conductor has a smooth profile.

6. A coaxial cable-connector assembly comprising:
   a. a coaxial cable comprising an elongate inner conductor and an elongate outer conductor circumferentially surrounding the inner conductor, and an elongate dielectric layer interposed between the inner conductor and the outer conductor, wherein the outer conductor has a leading end; and
   b. a coaxial connector comprising:
      an inner contact having a first end electrically connected to the inner conductor of the coaxial cable, and a second distal end;
      an outer conductive member having a first end that surrounds the leading end of the coaxial cable and a cylindrical distal end that surrounds the second distal end of the inner contact;
   wherein an electrical path is formed between the leading end of the outer conductor on the coaxial cable and the cylindrical distal end, and wherein a circumferential welded seam is located along the electrical path.

7. The assembly defined in claim 6, wherein the circumferential welded seam is formed directly between the leading end of the coaxial cable and the first end of the outer conductive member.

8. The assembly defined in claim 6, further comprising an overbody that circumferentially overlies the outer conductive member.

9. The assembly defined in claim 6, wherein the coaxial connector presents a standard 7/16 DIN male interface.

10. The assembly defined in claim 6, wherein the outer conductor has a smooth profile.

11. A coaxial cable-connector assembly comprising:
    a. a coaxial cable comprising an elongate inner conductor and an elongate outer conductor circumferentially surrounding the inner conductor, and an elongate dielectric layer interposed between the inner conductor and the outer conductor, wherein the outer conductor has a leading end; and
    b. a coaxial connector comprising:
       an inner contact having a first end electrically connected to the inner conductor of the coaxial cable, and a second distal end;
       an outer conductive member having a first end that surrounds the leading end of the coaxial cable and a cylindrical distal end that surrounds the second distal end of the inner contact;
    wherein an electrical path is formed between the leading end of the outer conductor on the coaxial cable and the cylindrical distal end, and wherein a molecular bond is located along the electrical path.

12. The assembly defined in claim 11, wherein the molecular bond is formed directly between the leading end of the coaxial cable and the first end of the outer conductive member.

13. The assembly defined in claim 11, further comprising an overbody that circumferentially overlies the outer conductive member.

14. The assembly defined in claim 11, wherein the coaxial connector presents a standard 7/16 DIN male interface.

15. The assembly defined in claim 11, wherein the outer conductor has a smooth profile.

* * * * *